April 16, 1929.   L. DREYFUS   1,709,120
COMBINATION OF INDUCTION MACHINE AND COMMUTATOR MACHINE
Filed Oct. 14, 1927

LUDWIG DREYFUS
INVENTOR
BY
ATTORNEY.

Patented Apr. 16, 1929.

1,709,120

UNITED STATES PATENT OFFICE.

LUDWIG DREYFUS, OF VASTERAS, SWEDEN, ASSIGNOR TO ALLMÄNNA SVENSKA ELEKTRISKA AKTIEBOLAGET, OF VASTERAS, SWEDEN, A CORPORATION OF SWEDEN.

COMBINATION OF INDUCTION MACHINE AND COMMUTATOR MACHINE.

Application filed October 14, 1927, Serial No. 226,078, and in Sweden October 15, 1926.

The present invention relates to the combination of an induction machine and a commutator machine connected in cascade thereto, in which the latter is provided with stator excitation (in practice, generally with salient poles) and is separately excited from a special frequency converter. If in this case a constant voltage is impressed on the exciting winding of the commutator machine, its excitation will vary with the frequency. It is, however, in most cases desirable that the said excitation be independent of the frequency, and the present invention has for its object to provide simple means for this purpose.

Figure 1:
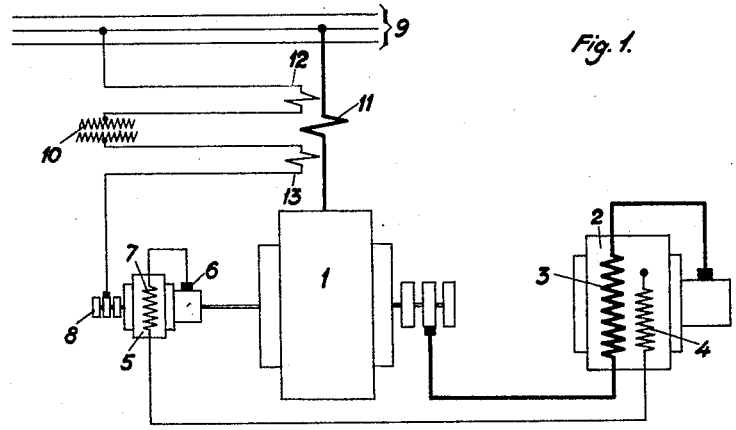
Figure 2:
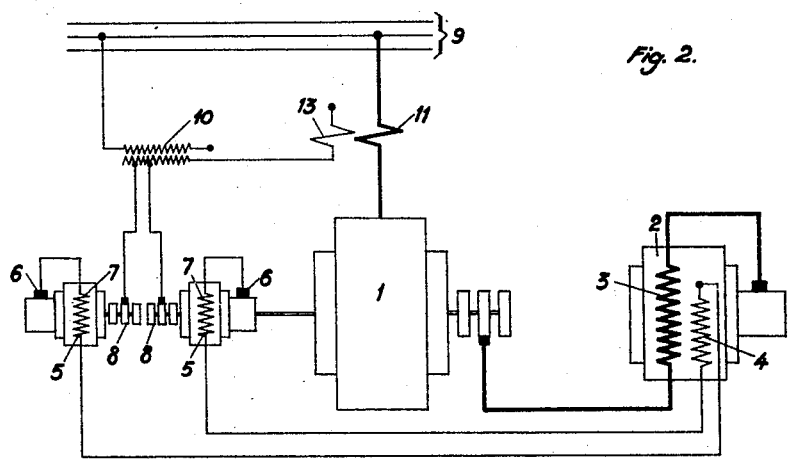
Figure 3:
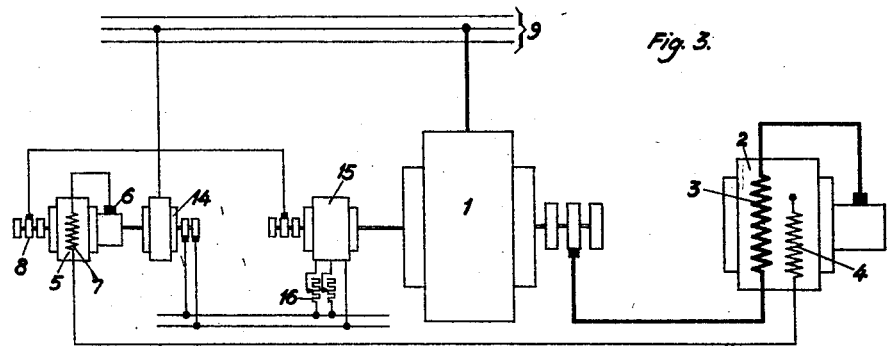

Three forms of the invention are diagrammatically illustrated in the accompanying drawing in Figs. 1, 2, and 3.

Referring to Fig. 1, 1 is the induction machine and 2 the commutator machine connected in cascade thereto. The latter has wound on its poles one series winding 3, chiefly intended for compensating its own armature reaction, but in some cases also for compounding the main machine, and one winding 4 separately fed from the frequency converter 5.

The last-mentioned machine is connected by means of sliprings 8 to the same mains 9 as the induction machine 1 and preferably mechanically coupled to the latter so as to produce, between its commutator brushes 6, the same frequency as in the rotor of the induction machine. It has a stator winding 7 which, however, does not contribute to the excitation of the machine which is entirely provided from the rotor. In the said stator winding, on the other hand, there will be induced a voltage, proportional to the frequency in the stator, that is, to the frequency between the stationary brushes. The phase of this voltage is determined by the position of the winding 7, as the phase of the voltage between the brushes depends on their position, and both positions should be so chosen that the two voltage components, that between the brushes 6 and that produced in the winding 7, will be in quarter-phase with one another. Further the voltage between the brushes should correspond to the ohmic drop and the voltage on the winding 7 (which is proportional to the frequency) should correspond to the inductive drop in the winding 4, which is equally proportional to the frequency. In this way, an excitation independent of the frequency is obtained in the winding 4.

The magnitude and the resultant phase of the voltages produced by the machine 5 may be regulated by various devices connected between this machine and the mains. Fig. 1 shows for this purpose one regulating main transformer 10 and one series transformer 11, 12, 13 connected between the supply conductors of the main machine and the frequency converter. By providing the series transformer with two secondary windings, one of which 12 is connected on the primary, one 13 on the secondary side of the transformer 10, load phase compensation as well as a compounding of the main machine may be obtained. The additional voltage for the first purpose should, as a matter of fact, be substantially proportional to the voltage (independent of the load) which is impressed for regulation of the no-load speed, and the device for producing it should therefore be connected on the primary side of the regulating transformer. The additional voltage for compounding purposes may, on the contrary, be substantially independent of the no-load voltage and only proportional to the load current of the main machine, for which purpose it may be delivered by the winding 13.

In the form shown in Fig. 2, there are provided two series-connected frequency converters 5 intended for regulating the voltage by rotating one or both of the stators so that the resultant voltage will vary although its components are constant. In this case, the transformer 10 may have constant ratio, and the secondary winding 12 of the series transformer shown in Fig. 1 may be omitted. The voltages impressed on the two frequency converters may be slightly different, as illustrated, or equal.

In the form shown in Fig. 3, the operation and voltage regulation of the frequency converter 5 is arranged in still another manner. The converter is thus driven by a synchronous motor 14 connected to the mains, and its sliprings are connected to a synchronous generator 15 driven by the main machine 1. The secondary frequency of the converter will thus, as is easily seen be equal to the slip frequency of the main machine. The voltage regulation on the frequency converter is here effected by a regulating resistance 16 in the exciting circuit of the synchronous generator 15. The exciting winding of the latter may be divided in two portions at right electrical angles to each other, whereby the voltage on the frequency converter will have two components which can be regulated independently.

The commutator machine 3 may in mechanical respect be coupled in any desirable manner, for instance to the main machine or to a separate machine.

I claim as my invention:—

The combination of a main induction machine, a commutator machine connected to the secondary terminals thereof, exciting means for said commutator machine comprising a primary portion adapted to supply substantially the ohmic component of the exciting voltage and a secondary portion adapted to supply substantially the reactive component of said voltage, a regulating transformer for supplying primary current to said exciter, and a series transformer having a primary winding traversed by the load current of the main machine, one secondary winding connected between said exciter and said regulating transformer and one secondary winding connected in the primary supply conductors to said transformer.

In testimony whereof I have affixed my signature to this specification.

LUDWIG DREYFUS.